(12) United States Patent
Jimbo et al.

(10) Patent No.: US 12,399,136 B2
(45) Date of Patent: Aug. 26, 2025

(54) SENSOR SYSTEM AND METHOD FOR MEASURING GAS LIQUID RATIO

(71) Applicant: FUJI ELECTRIC CO., LTD., Kanagawa (JP)

(72) Inventors: Naomichi Jimbo, Tokyo (JP); Naoki Takeda, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 313 days.

(21) Appl. No.: 18/158,607

(22) Filed: Jan. 24, 2023

(65) Prior Publication Data

US 2023/0280285 A1    Sep. 7, 2023

(30) Foreign Application Priority Data

Mar. 7, 2022   (JP) ................. 2022-034598

(51) Int. Cl.
*G01F 22/00* (2006.01)
*G01F 5/00* (2006.01)
*G01N 22/00* (2006.01)

(52) U.S. Cl.
CPC ........... *G01N 22/00* (2013.01); *G01F 5/00* (2013.01)

(58) Field of Classification Search
CPC ................... G01N 22/00; G01F 5/00
See application file for complete search history.

(56) References Cited

U.S. PATENT DOCUMENTS

| 6,012,324 | A | 1/2000 | Jakkula et al. |
| 6,448,791 | B1 | 9/2002 | Cewers |
| 11,231,310 | B2 * | 1/2022 | Strong ............. G01F 23/245 |
| 2012/0055239 | A1 * | 3/2012 | Sinha ............. G01F 25/10 |
| | | | 73/61.79 |
| 2016/0197198 | A1 | 7/2016 | Takeda et al. |
| 2017/0038491 | A1 | 2/2017 | Gonzalez et al. |
| 2017/0328843 | A1 * | 11/2017 | Sisler ............. G01F 1/586 |
| 2019/0242851 | A1 | 8/2019 | Sinha et al. |
| 2021/0096109 | A1 * | 4/2021 | Sinha ............. G01F 1/662 |

FOREIGN PATENT DOCUMENTS

| CN | 112924409 A * | 6/2021 | ............. G01N 15/06 |
| CN | 113280875 | 8/2021 | |
| JP | 2000-249673 | 9/2000 | |

(Continued)

OTHER PUBLICATIONS

Office Action mailed on Aug. 21, 2024 issued with respect to the corresponding New Zealand Patent Application No. 796652.

(Continued)

*Primary Examiner* — Francis C Gray
(74) *Attorney, Agent, or Firm* — IPUSA, PLLC

(57) ABSTRACT

A sensor system for measuring a gas liquid ratio of a two-phase fluid that flows through a pipe is provided. The sensor system includes a transmitter configured to transmit a radio wave into the pipe. The sensor system includes a receiver configured to receive the radio wave through the pipe. The sensor system includes a controller configured to calculate the gas liquid ratio based on both the radio wave received by the receiver and a decay time taken for attenuation of the radio wave after the transmitter terminates the transmission of the radio wave.

7 Claims, 11 Drawing Sheets

(56) References Cited

FOREIGN PATENT DOCUMENTS

| | | |
|---|---|---|
| JP | 2000-321228 | 11/2000 |
| JP | 2001-525934 | 12/2001 |
| JP | 2011-141238 | 7/2011 |
| WO | 2015/033499 | 3/2015 |

OTHER PUBLICATIONS

Office Action mailed on Dec. 19, 2023 issued with respect to the basic Japanese Patent Application No. 2022-034598.
Office Action mailed on Apr. 16, 2024 issued with respect to the basic Japanese Patent Application No. 2022-034598.

* cited by examiner

SENSOR SYSTEM AND METHOD FOR MEASURING GAS LIQUID RATIO

CROSS-REFERENCE TO RELATED APPLICATIONS

This application claims priority under 35 U.S.C. § 119 to Japanese Patent Application No. 2022-034598, filed Mar. 7, 2022, the contents of which are incorporated herein by reference in their entirety.

BACKGROUND

1. Field of the Invention

The present disclosure relates to a sensor system and a method for measuring a gas liquid ratio.

2. Description of the Related Art

Patent Document 1 discloses a method of determining a porosity in a two-phase mixture that is extracted in a geothermal power plant. For the method of determining a porosity in a two-phase mixture, Patent Document 1 discloses transmitting radio frequency signals into a transport pipe to receive the radio frequency signals, then determining the attenuation of an average signal strength, and finally determining the porosity of the two-phase mixture based on the attenuation of the average signal strength.

CITATION LIST

Patent Document

[Patent Document 1] U.S. Patent Application Publication No. 2017/0328843

When the radio wave is transmitted into the pipe, the radio wave and a corresponding reflected wave within the pipe interfere with each other, depending on the shape of the pipe, and thus there are cases where an electric field intensity distribution is formed. The electric field intensity distribution may induce error in a case where a gas liquid ratio is measured based on attenuated signal strength of the radio wave.

SUMMARY

According to one aspect of the present disclosure, a sensor system for measuring a gas liquid ratio of a two-phase fluid that flows through a pipe is provided. The sensor system includes a transmitter configured to transmit a radio wave into the pipe. The sensor system includes a receiver configured to receive the radio wave through the pipe. The sensor system includes a controller configured to calculate the gas liquid ratio based on both the radio wave received by the receiver and a decay time taken for attenuation of the radio wave after the transmitter terminates the transmission of the radio wave.

According to a sensor system and a method for measuring a gas liquid ratio in the present disclosure, when a radio wave is transmitted into a pipe to measure a gas liquid ratio, effects of an electric field intensity distribution can be reduced.

DESCRIPTION OF THE EMBODIMENTS

Figure 1:
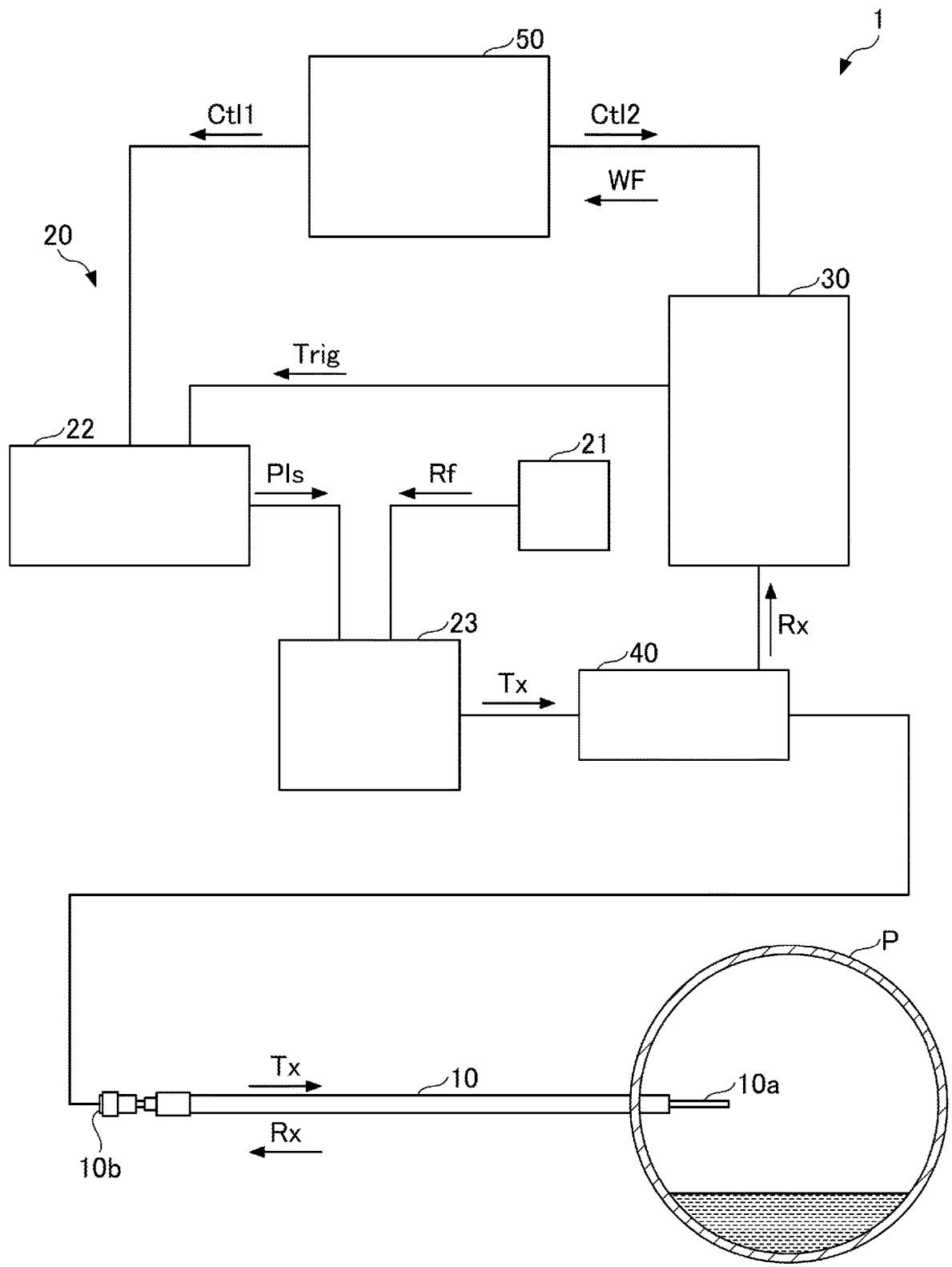
FIG. 1 is a schematic diagram illustrating the configuration of a sensor system according to the present embodiment.

Embodiments of the present invention are described below with reference to the accompanying drawings. In the description in the specification and the drawings associated with the embodiments, components having substantially the same or corresponding functional configurations are denoted by the same numerals, and accordingly, redundant description thereof may be omitted. For ease of understanding, the scale of each component in the drawings may differ from an actual scale.

Sensor System 1

A sensor system 1 according to the present embodiment is described below. FIG. 1 is a schematic diagram illustrating the configuration of the sensor system 1 according to the present embodiment.

The sensor system 1 is a system that measures a gas liquid ratio of a two-phase fluid that flows through a pipe P. The sensor system 1 transmits a radio frequency signal (radio wave) into the pipe P, and then calculates a gas liquid ratio based on a reception wave that propagates through the pipe P and is received by the sensor system 1.

The sensor system 1 includes an antenna 10, a transmitter 20, a receiver 30, a directional coupler 40, and a controller 50.

Antenna 10

The antenna 10 allows radio waves to be transmitted and received through the pipe P. The antenna 10 has a rod-like shape. A tip 10a of the antenna 10 is inserted in the pipe P via a hole that is provided in the pipe P. The radio wave is transmitted from the tip 10a of the antenna 10 into the pipe P. A rear end 10b of the antenna 10 is coupled to the transmitter 20 and the receiver 30 via the directional coupler 40.

The sensor system 1 according to the present embodiment includes one antenna 10 via which the radio waves are transmitted and received.

However, for example, a transmission antenna and a reception antenna may be separately provided. Also, the shape of the antenna 10 is not limited to the shape illustrated in FIG. 1, as long as the radio waves can be transmitted and received through the pipe P.

Transmitter 20

The transmitter 20 generates a transmission signal Tx that is an electric signal used to transmit the radio 15 wave into the pipe P via the antenna 10. The transmitter 20 includes a radio frequency-signal generation circuit 21, a pulse-signal generation circuit 22, and a mixing circuit 23.

Radio Frequency-Signal Generation Circuit 21

The radio frequency-signal generation circuit 21 generates, for example, a radio frequency signal Rf that is a continuous wave at a frequency of 1 GHz and has a constant amplitude. The radio frequency-signal generation circuit 21 is, for example, a voltage-controlled oscillator (VCO). The radio frequency-signal generation circuit 21 outputs the radio frequency signal Rf to the mixing circuit 23.

Pulse-Signal Generation Circuit 22

The pulse-signal generation circuit 22 generates a pulse signal Pls having a constant temporal width, in response to a trigger signal Trig that serves as a trigger. The pulse-signal generation circuit 22 is implemented, for example, by a pulse generator. The pulse-signal generation circuit 22 outputs the pulse signal Pls having a pulse to the mixing circuit 23. Upon the pulse signal Pls being generated by the pulse-signal generation circuit 22, the sensor system 1 intermittently transmits the radio wave into the pipe P.

Mixing Circuit 23

The mixing circuit 23 multiplies the radio frequency signal Rf output from the radio frequency-signal generation circuit 21, by the pulse signal Pls output from the pulse-signal generation circuit 22, to thereby generate the transmission signal Tx. The mixing circuit 23 is implemented, for example, by a mixer. The mixing circuit 23 outputs the transmission signal Tx to the directional coupler 40.

Receiver 30

The receiver 30 receives a reception signal Rx that is an electric signal based on the radio wave received via the antenna 10. The receiver 30 uses the reception signal Rx for analog-to-digital conversion so that the reception signal Rx is converted into a reception waveform signal WF that the controller 50 can adjust. The receiver 30 outputs the reception waveform signal WF to the controller 50.

The receiver 30 also transmits the trigger signal Trig to the pulse-signal generation circuit 22.

Directional Coupler 40

The directional coupler 40 outputs the transmission signal Tx output from the mixing circuit 23 to the antenna 10. The directional coupler 40 also outputs the reception signal Rx output via the antenna 10 to the receiver 30. The directional coupler 40 is, for example, a unidirectional coupler. The directional coupler includes, for example, a loop directional coupler, a distributed coupling-type directional coupler, or the like.

The directional coupler 40 inhibits the transmission signal Tx from being input to the receiver 30, and inhibits the reception signal Rx from being input to the transmitter 20.

Controller 50

The controller 50 controls each of the transmitter 20 and the receiver 30. The controller 50 also calculates a gas liquid ratio of the two-phase fluid flowing through the pipe P, based on the reception waveform signal WF output from the receiver 30.

The controller 50 includes, for example, a central processing unit (CPU), a random access memory (RAM), and a read-only memory (ROM). For example, the controller 50 executes a process by the CPU that executes a program stored in the ROM.

The controller 50 transmits a control signal Ctl1 to the pulse-signal generation circuit 22 in the transmitter 20. The control signal Ctl1 includes, for example, a set value and the like used to set a pulse width or the like of the pulse signal Pls that the pulse-signal generation circuit 22 generates. The controller 50 transmits a control signal Ctl2 to the receiver 30. The control signal Ctl2 includes, for example, a setting value or the like used to set a width and the like of a waveform that the receiver 30 obtains.

The controller 50 also receives the reception waveform signal WF from the receiver 30. The controller 50 calculates, based on the reception waveform WF, a decay time taken for attenuation of the reception signal Rx. Then, the controller 50 calculates a gas liquid ratio of the two-phase fluid that flows through the pipe P, based on the calculated decay time taken for the attenuation of the reception signal Rx.

<Transmission and Reception of Radio Waves in Sensor System 1>

Figure 2:
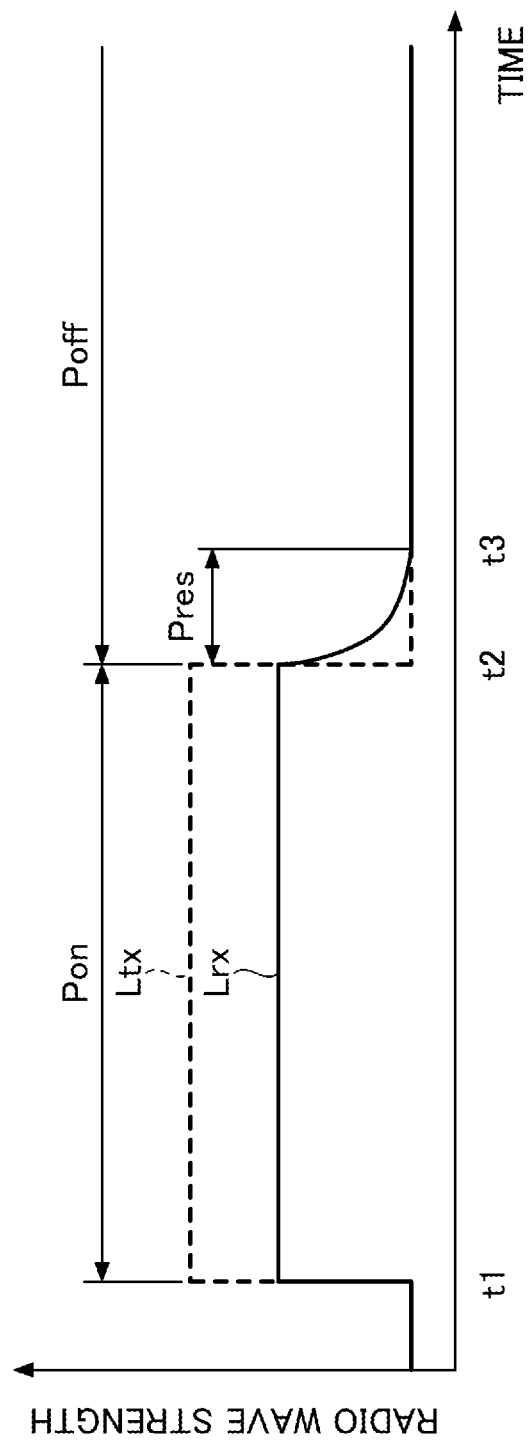
FIG. 2 is a diagram illustrating transmission and reception of radio waves at the sensor system according to the present embodiment.

The transmission signal Tx and the reception signal Rx in the sensor system 1 are described below in a case where radio waves are transmitted and received through the pipe P. FIG. 2 is a schematic diagram illustrating the transmission and reception of the radio waves in the sensor system 1 according to the present embodiment. In FIG. 2, the vertical axis represents the radio wave strength, and the horizontal axis represents the time. Ltx indicates the waveform of the transmission signal Tx that the transmitter 20 transmits, and Lrx indicates the waveform of the reception signal Rx that the receiver receives.

The transmitter 20 initiates transmission of radio waves at time t1. Then, the transmitter 20 terminates the transmission at time t2. A period from the time t1 to the time t2 is referred to as a transmission period Pon. A period during which the transmitter 20 terminates the transmission after the time t2 is referred to as a termination period Poff.

During the transmission period Pon, the receiver 30 continuously receives the radio wave that is transmitted via the antenna 10 and propagates through the pipe P, in response to the transmission signal Tx. At the time t2, upon the transmitter 20 terminating the transmission, a portion of the radio wave, which is transmitted while being reflected within the pipe P, remains within the pipe P. With this arrangement, the receiver 30 continues to receive the reception signal Rx during a period Pres that is set from the time t2 to a time t3.

Figure 3:
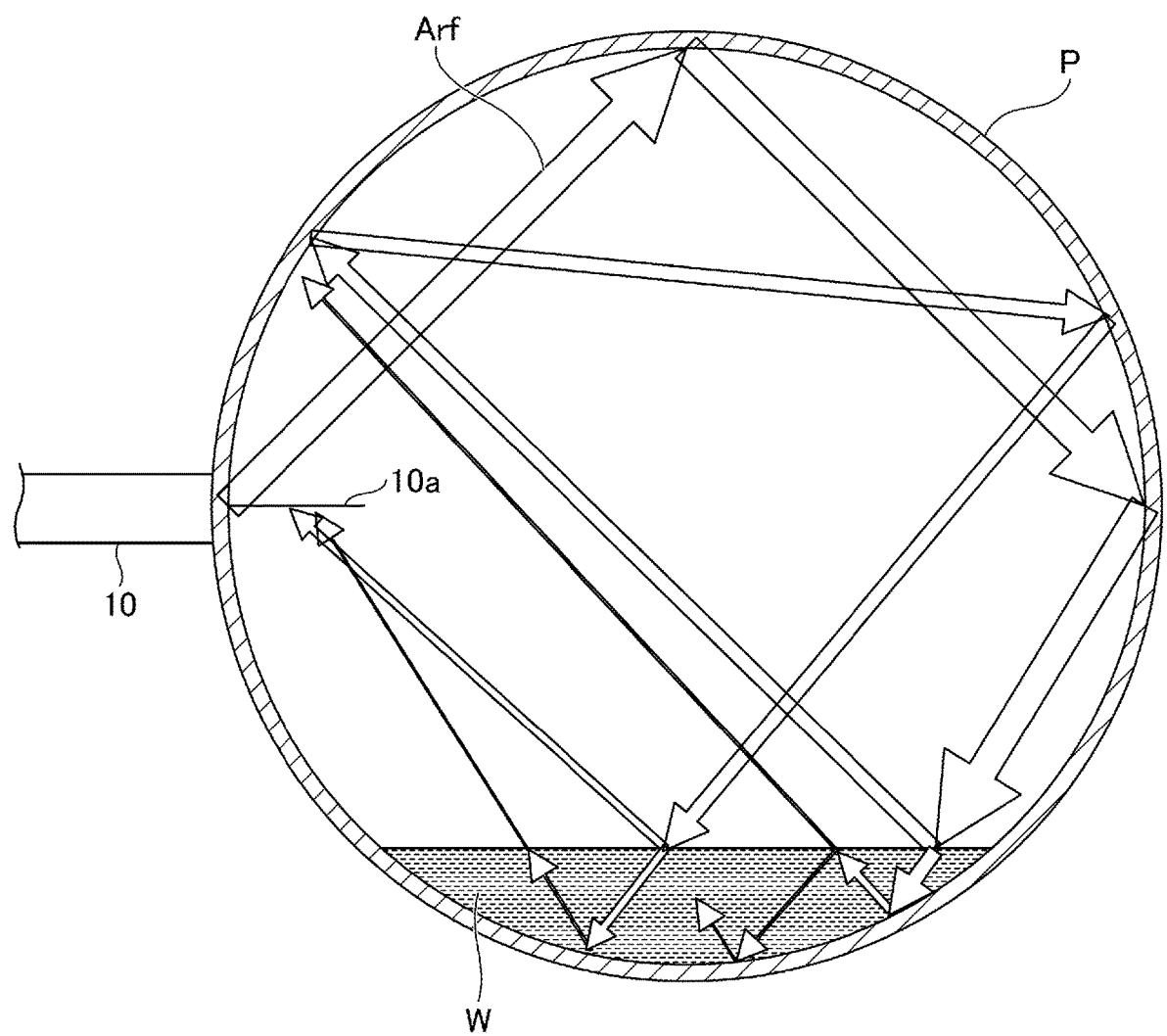
FIG. 3 is a diagram for describing the attenuation of the radio wave used in the sensor system according to the present embodiment.

The attenuation of the radio wave that remains within the pipe P is described below. FIG. 3 is a diagram illustrating the attenuation of the radio wave in the sensor system 1 according to the present embodiment. FIG. 3 is a schematic diagram illustrating the attenuation of the radio wave transmitted via the antenna 10 in the sensor system 1 according to the present embodiment.

The radio wave transmitted from the tip 10a of the antenna 10 propagates while being reflected within the pipe P, for example, as indicated by an arrow Arf. The radio wave that returns to the antenna 10 through reflection is received by the receiver 30 as the reception signal Rx.

Radio waves radiated into the interior of the pipe P propagate through the gas and/or liquid phase that fills the pipe P. When the radio wave propagates in the case of the gaseous phase or the liquid phase, radio wave strength is attenuated in accordance with an propagation distance. A decay rate of the radio wave in the case of the liquid phase is greater than a decay rate of the radio wave in the case of the gaseous phase. With this arrangement, the decay rate of the radio wave propagating through the pipe P is increased in accordance with an increasing rate for the liquid phase.

In accordance with an increasing decay rate of the radio wave within the pipe P, the radio wave is further attenuated within the pipe P. In this case, after the transmission of the radio wave is terminated at the time t2, the period Pres during which the receiver 30 receives the radio wave becomes short. With this arrangement, in the sensor system 1 according to the present embodiment, a given decay time taken for the attenuation of the radio wave after termination of the transmission of the radio wave is calculated, and then a given gas liquid ratio of the two-phase fluid flowing through the pipe P is calculated based on the given decay time.

<Process at Sensor System 1>

Figure 4:
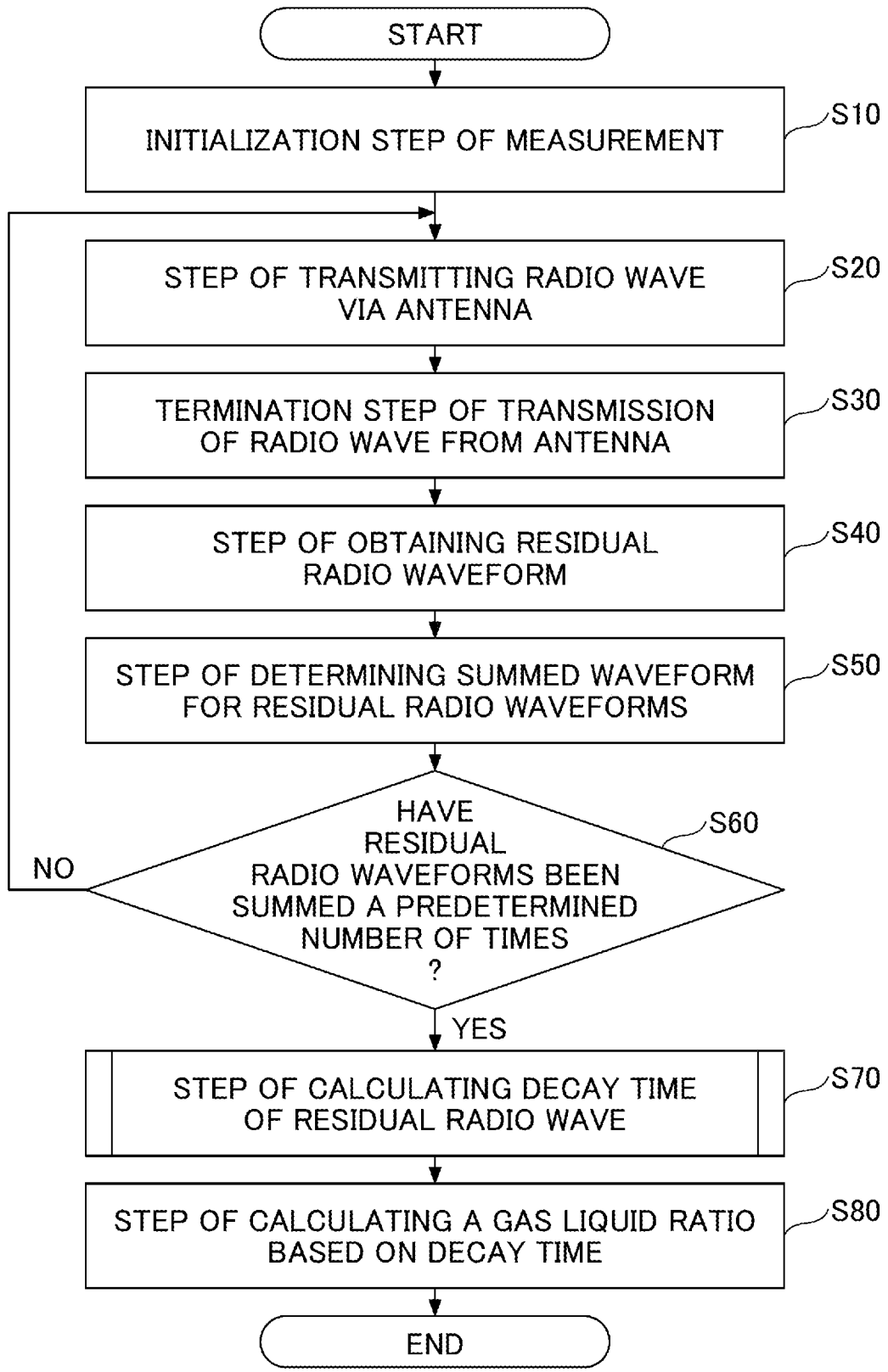
FIG. 4 is a flowchart for describing the process at the sensor system according to the present embodiment.

The process at the sensor system 1 according to the present embodiment is described below. A method for measuring the gas liquid ratio according to the present embodiment is described below while describing the process at the sensor system 1. FIG. 4 is a flowchart illustrating the process at the sensor system 1 according to the present embodiment.

(Step S10)

First, the sensor system 1 initializes measurement (initialization step of measurement). Specifically, the controller 50 initializes a buffer for determining a residual radio waveform.

(Step S20)

Next, the sensor system 1 transmits the radio wave via the antenna 10 (step of transmitting the radio wave via the antenna). Specifically, the transmission signal Tx is output from the transmitter 20 to the antenna 10. In the transmitter 20, the radio frequency-signal generation circuit 21 outputs the radio frequency signal Rf. Also, the pulse-signal generation circuit 22 outputs the pulse signal Pls in response to receiving the trigger signal Trig. The mixing circuit 23 outputs the transmission signal Tx to the antenna 10, based on the radio frequency signal Rf and the pulse signal Pls. Then, the radio wave that is based on the transmission signal Tx is transmitted into the pipe P via the antenna 10.

(Step S30)

Then, the sensor system 1 terminates the transmission of the radio wave from the antenna 10 (termination step of transmission of the radio wave from the antenna). Specifically, the transmission signal Tx is generated by the pulse signal Pls output from the pulse-signal generation circuit 22. With this arrangement, after the radio wave is continuously transmitted via the antenna 10 during a predetermined time period, the transmission of the radio wave is terminated.

(Step S40)

Then, in the sensor system 1, the receiver 30 receives the reception signal Rx to obtain the residual radio waveform that remains within the pipe P (step of obtaining the residual radio waveform). Specifically, the receiver 30 obtains the reception signal Rx until a predetermined time period elapses after the transmission of the radio wave is terminated. Subsequently, the receiver 30 transfers the obtained reception signal Rx to the controller 50 as the reception waveform signal WF that is a temporal residual radio waveform.

(Step S50)

Then, the sensor system 1 calculates a summed waveform based on residual radio waveforms (step of determining a summed waveform for residual radio waveforms). Specifically, the controller 50 sums the residual radio waveform as obtained in step S40 and a residual radio waveform as stored in the buffer. When the residual radio waveforms are summed, for example, the residual radio waveform obtained in step S40 may be added to the residual radio waveform stored in the buffer, or the averaging of the residual radio waveforms may be performed. With use of the summed waveform, a plurality of temporal residual radio waveforms can be averaged.

(Step S60)

Then, the controller 50 of the sensor system 1 determines whether the residual radio waveforms have been summed a predetermined number of times. If summing has been performed a predetermined number of times (Yes in step S60), the process proceeds to step S70. If summing is not performed a predetermined number of times (No in step S60), the process returns to step S20 to repeat the process.

A summed number of times may be appropriately determined in consideration of noise or the like. When the noise is negligible, the summed number of times may be set to one. That is, the process may be performed using the obtained residual radio waveform itself.

(Step S70)

Figure 5:
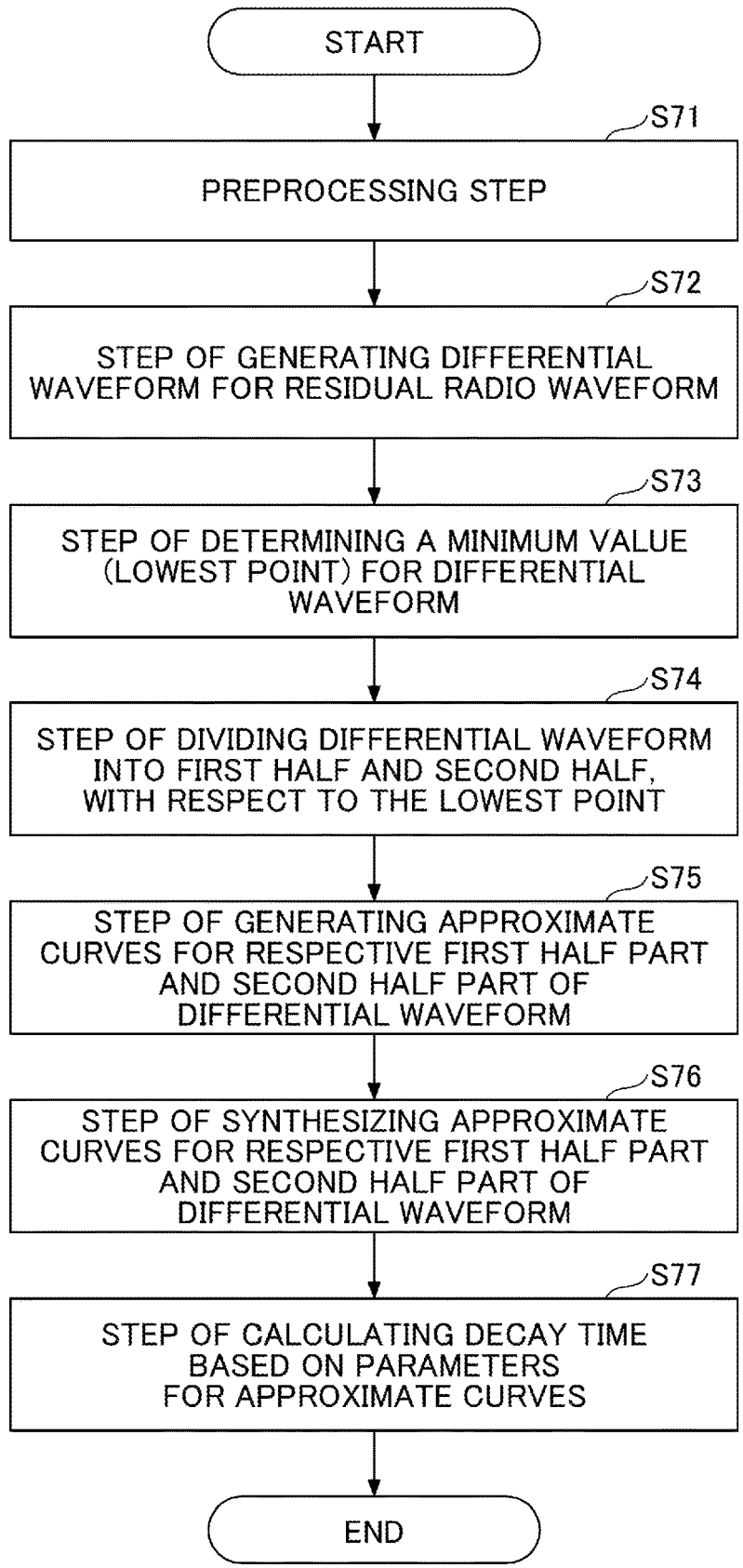
FIG. 5 is a flowchart for describing the process at the sensor system according to the present embodiment.

If summing has been performed a predetermined number of times in step S60 (Yes in step S60), the controller 50 of the sensor system 1 calculates a decay time of the residual radio wave (step of calculating a decay time of the residual radio wave). The decay time of the residual radio wave is a time period taken for attenuation of the radio wave after transmission of the radio wave is terminated. In other words, the decay time of the residual radio wave is a time period taken for attenuation of the radio wave to be completed after transmission of the radio wave is terminated. The process in step S70 will be described below in detail with reference to FIG. 5. FIG. 5 is a flowchart illustrating the process of calculating the decay time at the sensor system 1 according to the present embodiment.

(Step S71)

First, the controller 50 of the sensor system 1 preprocesses the residual radio waveform (preprocessing step). Specifically, the controller 50 performs a filtering process such as averaging, in the preprocessing step. In addition, in the preprocessing step, the controller 50 performs, for example, a process of deleting data of which a value significantly varies locally, by removing a corresponding spike of the summed waveform for the residual radio waves. By performing the preprocessing step, the controller 50 removes one or more noise components that result in negative effects during the calculating of the decay time.

(Step S72)

Then, the controller 50 calculates a differential waveform for the residual radio waveform, based on the residual radio waveform (step of generating a differential waveform for the residual radio waveform). For example, by any known method such as a difference approach, the controller 50 calculates a derivative value (i.e., an amplitude difference) for the residual radio waveform, based on signal strength values for the residual radio waves that are obtained before and after a given sample. Subsequently, the controller 50 obtains derivative values for the residual radio waveform, over a predetermined range of time to determine the differential waveform for the residual radio waveform.

Figure 6:
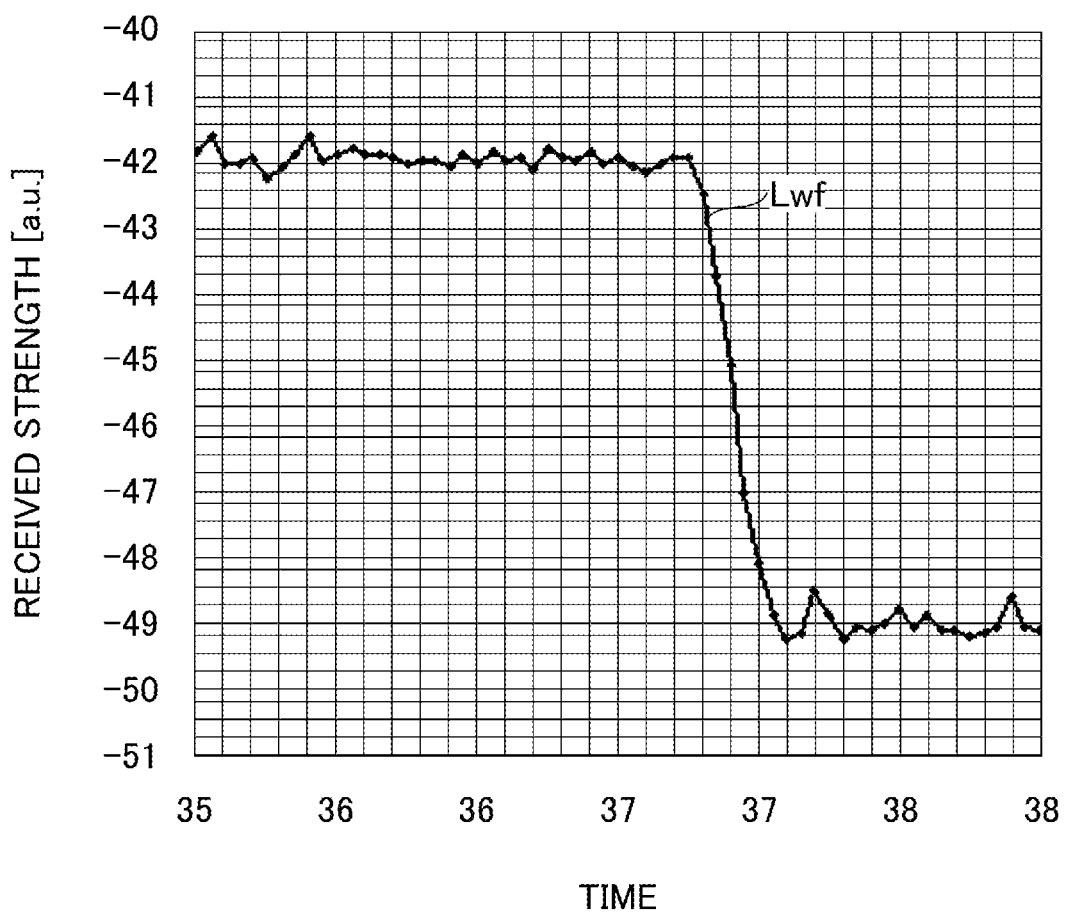
FIG. 6 is a diagram for describing the process at the sensor system according to the present embodiment.
Figure 7:
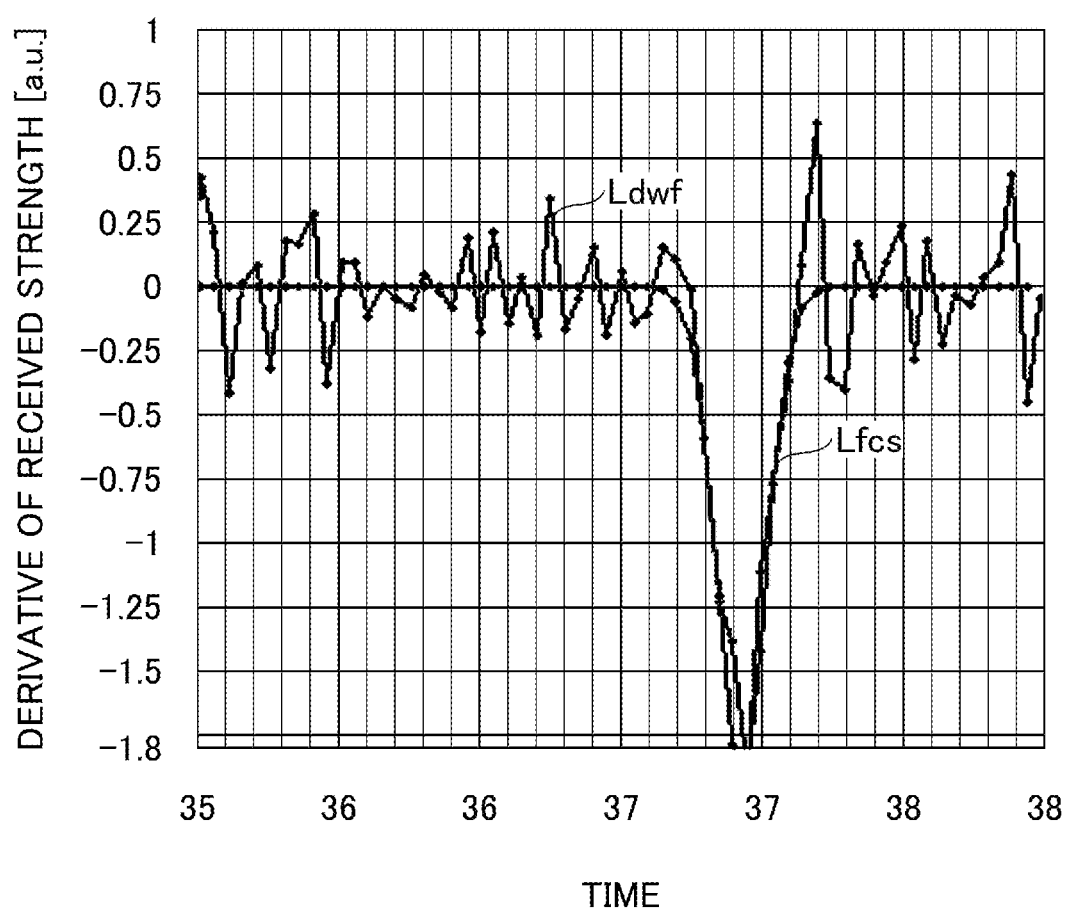
FIG. 7 is a flowchart for describing the process at the sensor system according to the present embodiment.

FIG. 6 is a diagram illustrating the residual radio waveform in the process at the sensor system 1 according to the present embodiment. In FIG. 6, the horizontal axis represents the time, and the vertical axis represents the received strength. Lwf in FIG. 6 indicates the residual radio waveform. FIG. 7 is a diagram illustrating the differential waveform for the residual radio waveform in the process at the sensor system 1 according to the present embodiment. In FIG. 7, the horizontal axis represents the time, and the vertical axis represents a derivative of the received signal strength. Ldwf in FIG. 7 indicates the differential waveform for the residual radio wave. In FIG. 7, Lfcs indicates a synthesized approximation waveform as described later.

(Step S73)

Then, the controller 50 calculates a minimum value (lowest point) for the differential waveform (step of calculating a minimum value (lowest point) for the differential waveform). Specifically, the controller 50 determines the minimum value (lowest point) for the differential waveform for the residual radio wave as determined in step S72.

(Step S74)

Then, the controller 50 divides the differential waveform into a first half waveform and a second half waveform, with respect to the lowest point (step of dividing the differential waveform into a first half and a second half, with respect to the lowest point). The lowest point applies to both the first half waveform and the second half waveform. For example, the lowest point corresponds to both a last point for the first half waveform and a first point for the second half waveform.

(Step S75)

Then, the controller 50 generates an approximate curve based on a Gaussian function, for each of the first half waveform and second half waveform into which the differential waveform divides (step of generating an approximate curve for each of a first half part and a second half part of the differential waveform). In the sensor system 1 according to the present embodiment, each approximate curve is generated based on a corresponding Gaussian function.

An approximation function for the first half waveform is referred to as an approximation function f1(t), and an approximation function for the second half waveform is referred to as an approximation function f2(t). Where, t represents the time.

The approximation function f1(t) is given by Equation 1. Where, a1, b1, and of are determined by applying (i.e., curve fitting) the first half waveform to a curve. The applying of the first half waveform to the curve (i.e., curve fitting) is enabled by applying (fitting) a first half part of a given Gaussian function. Where, a1 relates to the magnitude of a derivative of received single strength, b1 relates to a position in a temporal direction of the given Gaussian function, and σ1 is a standard deviation of the given Gaussian function. The σ1 relates to a given decay time.

[Equation 1]

$$f1(t) = a1\ \exp\left(-\frac{(t-b1)^2}{\sigma 1^2}\right) \quad \text{(EQUATION 1)}$$

The approximation function f2(t) is given by Equation 2. Where, a2, b2, and σ2 are determined by applying (i.e., curve fitting) the second half waveform to a curve. The applying of the second half waveform to the curve (i.e., curve fitting) is enabled by applying (curve fitting) a second half part of a given Gaussian function. Where, a2 relates to the magnitude of a derivative of received signal strength, b2 relates to a position in a temporal direction of the given Gaussian function. The σ2 is a standard deviation of the given Gaussian function. The σ2 relates to a given decay time.

[Equation 2]

$$f2(t) = a2\ \exp\left(-\frac{(t-b2)^2}{\sigma 2^2}\right) \quad \text{(EQUATION 2)}$$

A specific processing method for curve fitting is performed using any known approach.

(Step S76)

Then, the controller 50 synthesizes approximate curves determined in step S75 (step of synthesizing approximate curves of the first half part and second half part of the differential waveform). The controller 50 combines the approximate curve calculated in step S75, that is, the approximation function f1(t) and the approximation function f2(t). In proximity to the lowest point, for example, an averaging process may be performed such that the approximation function f1(t) and the approximation function f2(t) are smoothly combined with each other.

Figure 8:
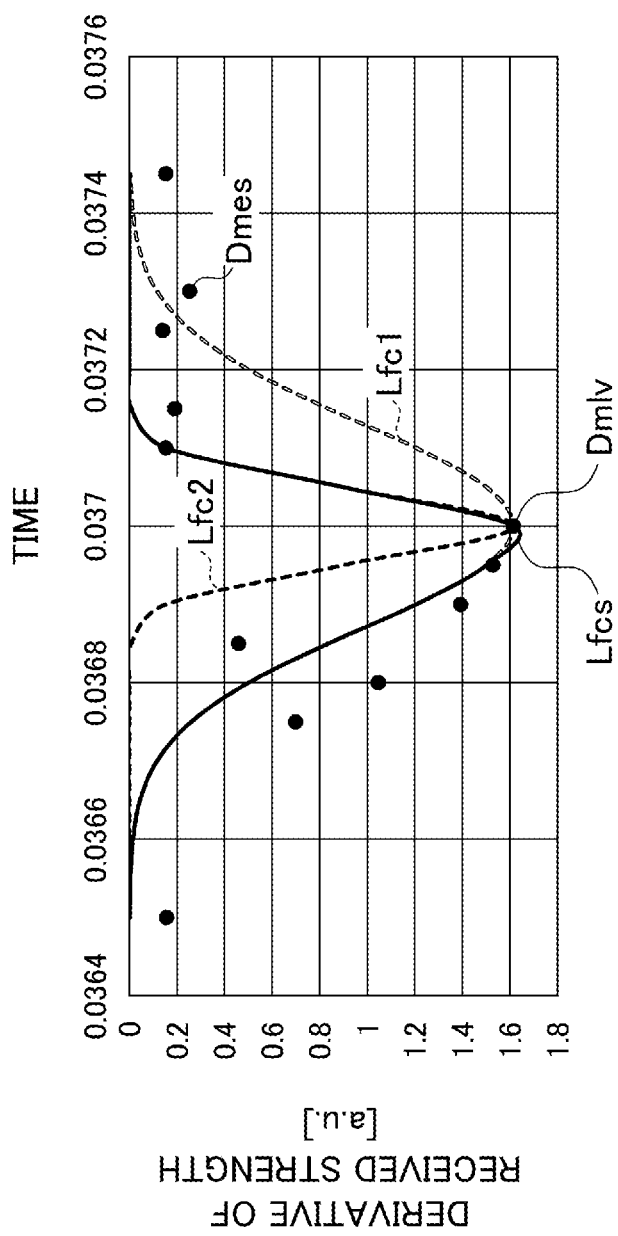
FIG. 8 is a diagram for describing the process at the sensor system according to the present embodiment.

Specific results processed by the controller 50 are described below. FIG. 8 is a diagram illustrating the process by the controller 50 of the sensor system 1 according to the present embodiment. In FIG. 8, the horizontal axis represents the time, and the vertical axis represents the derivative of received signal strength.

Each of Dmes illustrated in FIG. 8 indicates a derivative of a received waveform. Dmlv indicates the lowest point. Lfc1 indicates a first half waveform, that is, an approximation waveform (which corresponds to the approximation function f1(t)) that is obtained by applying, to a given Gaussian function, the lowest point Dmlv and derivatives Dmes located before the lowest point Dmlv. Lfc2 indicates a second half waveform, that is, an approximation waveform (which corresponds to the approximation function f2(t)) that is obtained by applying, to a given Gaussian function, the lowest point Dmlv and derivatives Dmes located after the lowest point Dmlv. Lfcs indicates a synthesized approximation waveforms in which the first half waveform and the second half waveform are combined with each other.

(Step S77)

Then, the controller 50 calculates a decay time of the residual radio waveform, based on parameters of the approximate curves determined in step S75 (step of calculating a decay time based on parameters of approximate curves). Specifically, the controller 50 calculates the decay time based on σ1 and σ2 obtained in step S75. More specifically, the controller 50 sums σ1 and σ2 obtained in step S75 to calculate the decay time. For the decay time, half widths derived from corresponding Gaussian functions are determined based on σ1 and σ2, respectively, and then the decay time may be calculated based on the half widths.

(Step S80)

Then, the controller 50 calculates a gas liquid ratio based on the decay time calculated in step S77 (step of calculating a gas liquid ratio based on the decay time). When the gas liquid ratio is calculated based on the decay time, for example, a process of manually calculating a given gas liquid ratio by tracer flow testing or the like, as well as a process of calculating a given decay time by the sensor system 1, are simultaneously performed in advance, then the relationship between the given decay time and the given gas liquid ratio is checked, and finally a calibration curve of the gas liquid ratio corresponding to the decay time is generated. Subsequently, the calibration curve generated in advance is used to calculate the gas liquid ratio based on a corresponding decay time.

<Measurement Result at Sensor System 1>

Figure 9:
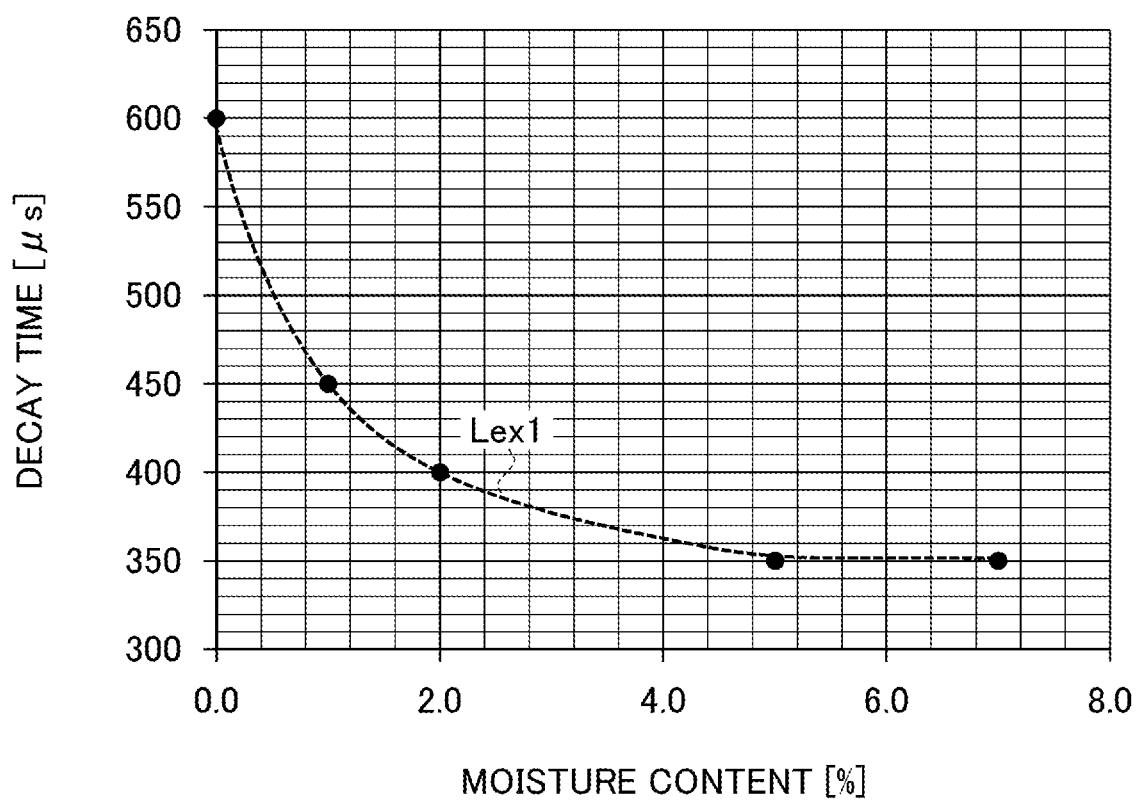
FIG. 9 is a diagram illustrating an evaluation result for the sensor system according to the present embodiment.

The measurement result that is obtained using the sensor system 1 according to the present embodiment is described below. FIG. 9 is a diagram illustrating an evaluation result for the gas liquid ratio (moisture content) that is measured using the sensor system 1 according to the present embodiment. In FIG. 9, the horizontal axis represents the measured gas liquid ratio (moisture content) of the two-phase fluid, and the vertical axis represents the decay time as calculated by the sensor system 1.

According to the sensor system 1, it has been confirmed that the decay time monotonically changes in accordance with the gas liquid ratio (moisture content) when the moisture content is 5% or less. That is, a given decay time of the residual radio wave is measured using the sensor system 1 to thereby enable a given gas liquid ratio of the two-phase fluid flowing through the pipe P to be measured.

Figure 10:
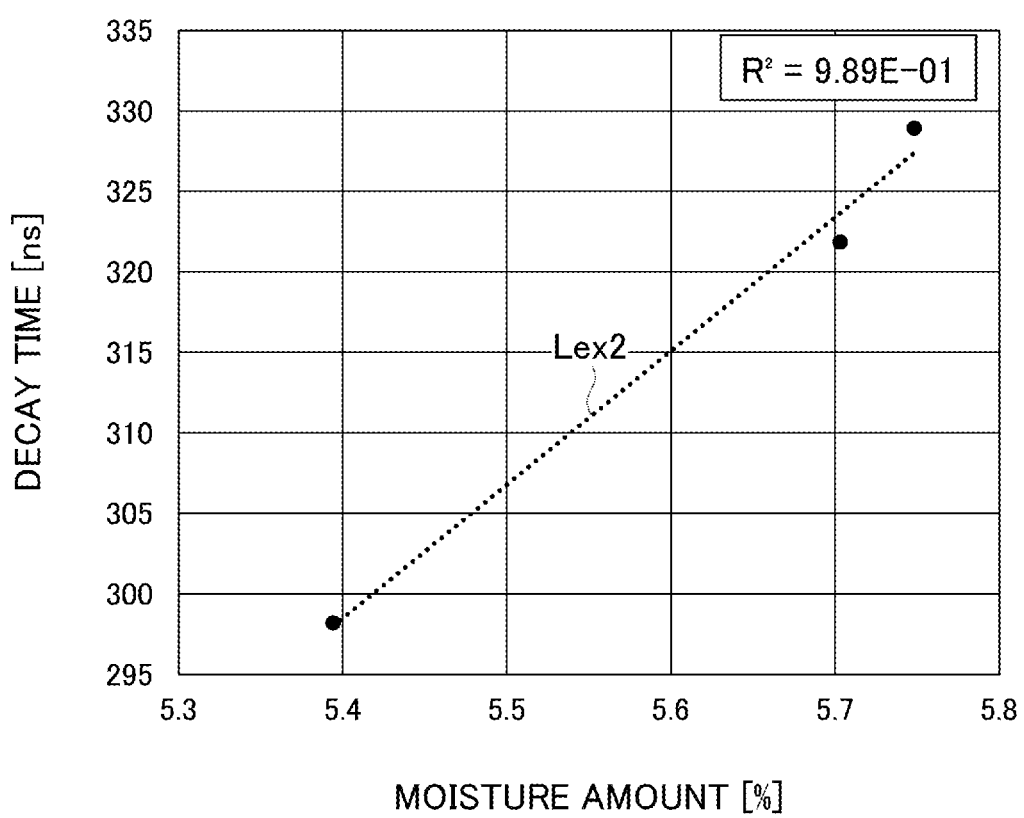
FIG. 10 is a diagram illustrating the evaluation result for the sensor system according to the present embodiment.

FIG. 10 is a diagram illustrating an evaluation result of the correlation between a given gas liquid ratio (moisture content) and a given decay time, and the evaluation result is obtained using the sensor system 1 according to the present embodiment. Where, Lex2 indicates the resulting linear approximation that is based on three points proximal to a moisture content of 5.5%. A correlation coefficient is 0.989, which indicates that a given gas liquid ratio of the two-phase fluid flowing through the pipe P can be measured using the decay time of the residual radio wave.

Figure 11:
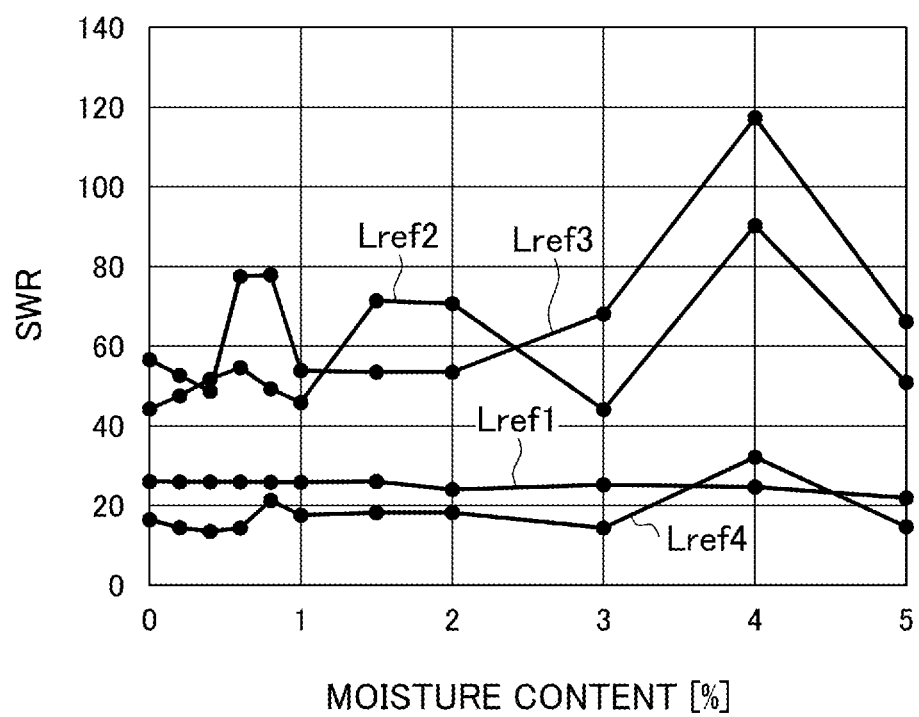
FIG. 11 is a diagram illustrating an evaluation result for the sensor system in a reference example.

As a reference example, standing wave ratios (SWRs) are calculated while transmitting and receiving radio waves through the pipe P continuously. The resulting standing wave ratios are described below. Each standing wave ratio is a ratio between strength of the radio wave transmitted via the antenna and strength of the radio wave received via the antenna. FIG. 11 is a diagram illustrating an evaluation result for the sensor system in the reference example. In FIG. 11, the horizontal axis represents the gas liquid ratio (moisture content), and the vertical axis represents the standing wave ratio (SWR).

Where, Lref1, Lref2, Lref3, and Lref4 in FIG. 11 indicate results obtained when radio waves at frequencies of 0.7 GHz, 1.2 GHz, 1.5 GHz, and 2.4 GHz are emitted, respectively.

As seen from FIG. 11 in which the standing wave ratios are used, there are no available changes in the standing wave ratio in accordance with the gas liquid ratio (moisture content), and thus no gas liquid ratio (moisture content) can be calculated based on a given standing wave ratio. This is because the distribution of a given electric field intensity is considered to be formed through interference between the transmission wave that is transmitted into the pipe and the reception wave that is returned through reflection of the transmission wave within the pipe.

In contrast, according to the sensor system 1 of the present embodiment, the gas liquid ratio is calculated based on the decay time of the radio wave that is determined in response to the transmitter 20 terminating the transmission of the radio wave. By calculating the gas liquid ratio based on the decay time of the radio wave that is determined in response to the transmitter 20 terminating the transmission of the radio wave, the gas liquid ratio can be measured with high accuracy, such that interference between the transmission wave and the reception wave is suppressed and such that effects of the distribution of the electric field intensity within the pipe P is suppressed.

In addition, according to the sensor system 1 in the present embodiment, by summing and measuring received waveforms, effects of noise are suppressed and a given gas liquid ratio can be further measured with high accuracy.

It should be understood that the embodiments disclosed herein are illustrative in all aspects and are not limiting. Omissions, substitutions, and changes in various forms of the above-mentioned embodiments may be made without departing from the scope and spirit of the disclosure.

What is claimed is:

1. A sensor system for measuring a gas liquid ratio of a two-phase fluid that flows through a pipe, the sensor system comprising:
   a transmitter configured to transmit a radio wave into the pipe, and terminate the transmission of the radio wave;
   a receiver configured to receive the radio wave through a gas phase or a liquid phase in the pipe; and
   a controller configured to
      calculate a decay time taken for attenuation of the radio wave after the transmitter terminates the transmission of the radio wave, and
      calculate the gas liquid ratio based on the decay time.

2. The sensor system according to claim 1, wherein the transmitter is configured to intermittently transmit the radio wave, and
   wherein the controller is configured to average a plurality of temporal waveforms for the radio wave that is received by the receiver.

3. The sensor system according to claim 1, further comprising an antenna,
   wherein the transmitter is configured to transmit the radio wave into the pipe via the antenna, and
   wherein the receiver is configured to receive the radio wave via the antenna.

4. The sensor system according to claim 1, wherein the controller is configured to
   calculate a change rate of an intensity waveform of the radio wave received by the receiver, with respect to time, and
   calculate the decay time based on the change rate.

5. The sensor system according to claim 4, wherein the controller is configured to
   determine a curve representing the change rate with respect to a time axis,
   divide the curve into a first half curve and a second half curve with respect to a minimum value of the change rate, and
   calculate the decay time based on a combination curve of the first half curve and the second half curve.

6. The sensor system according to claim 5, wherein the curve is determined using a Gaussian function, and wherein the controller is configured to calculate the decay time based on a standard deviation of the Gaussian function.

7. A method for measuring a gas liquid ratio of a two-phase fluid that flows through a pipe, the method comprising:
   transmitting a radio wave into the pipe, the radio wave propagating through a gas phase or a liquid phase in the pipe;
   terminating the transmission of the radio wave;
   calculating a decay time that is taken for attenuation of the radio wave after the terminating of the radio wave; and
   calculating the gas liquid ratio based on the decay time.

* * * * *